United States Patent [19]
Knapp

[11] 3,970,945
[45] July 20, 1976

[54] METHOD AND APPARATUS FOR DEMODULATING PSK MODULATED OSCILLATIONS

[75] Inventor: Siegbert Knapp, Ulm (Danube), Germany

[73] Assignee: Licentia Patent-Verwaltungs-G.m.b.H., Frankfurt am Main, Germany

[22] Filed: Oct. 29, 1974

[21] Appl. No.: 519,780

[30] Foreign Application Priority Data
Nov. 2, 1973 Germany.......................... 2354718

[52] U.S. Cl............................... 329/104; 178/88; 325/320; 329/122; 329/126
[51] Int. Cl.²...................................... H03K 7/04
[58] Field of Search.................... 329/104, 122, 126; 325/320; 178/88

[56] References Cited
UNITED STATES PATENTS

| | | |
|---|---|---|
| 3,571,712 | 3/1971 | Hellwarth et al. ............ 329/104 UX |
| 3,636,454 | 1/1972 | Pasternack et al. ............ 329/104 X |
| 3,656,064 | 4/1972 | Giles et al............................ 329/104 |
| 3,691,466 | 9/1972 | Wachs ............................ 329/104 X |

*Primary Examiner*—John Kominski
*Attorney, Agent, or Firm*—Spencer & Kaye

[57] ABSTRACT

A method and apparatus for demodulating an input signal modulated according to the phase shift keying (PSK) modulation method wherein the modulated input signal is combined with a reference voltage of the same frequency which is leading in phase by one-quarter of the period duration of the input signal, the resulting output signal is delayed in time by one-half of the period duration of the input signal and is combined with an identical but undelayed signal to provide a control voltage, and the control voltage is utilized for setting the phase of a further reference voltage which is then combined with the input signal to produce the demodulated output voltage.

3 Claims, 6 Drawing Figures

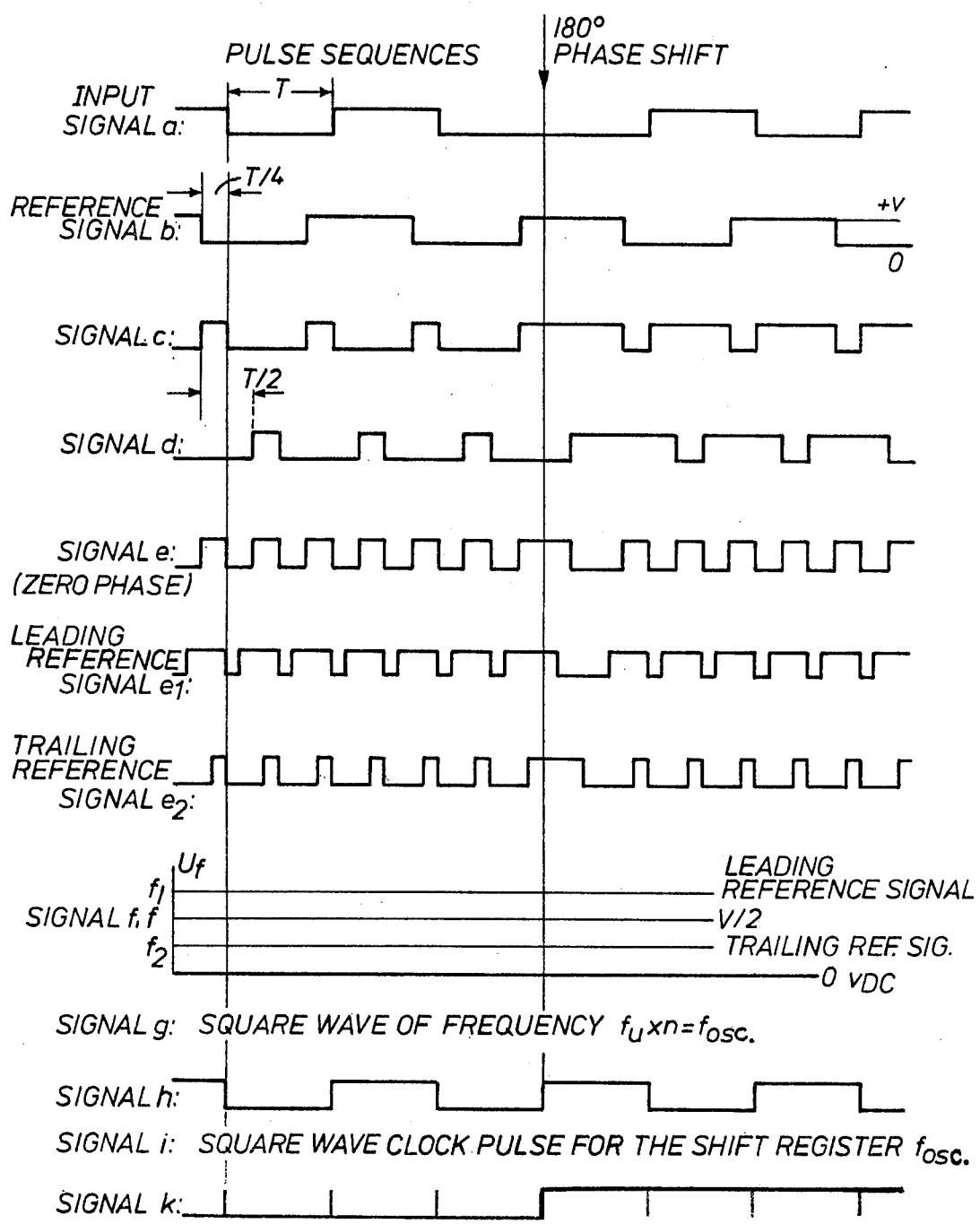

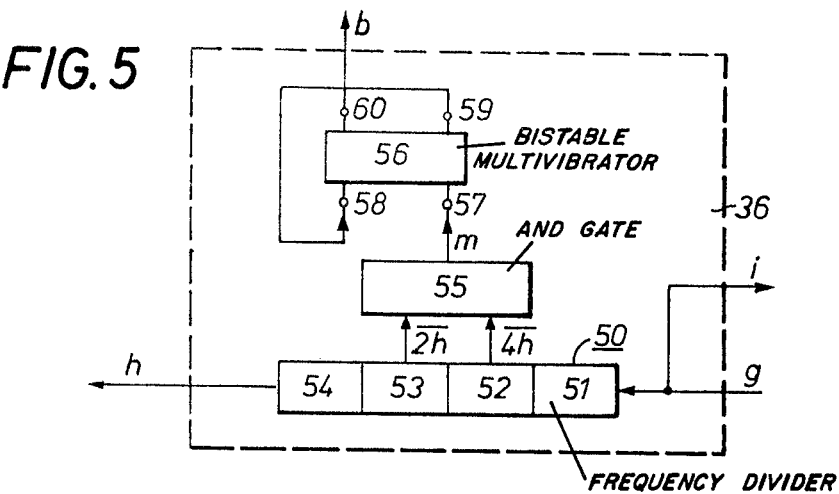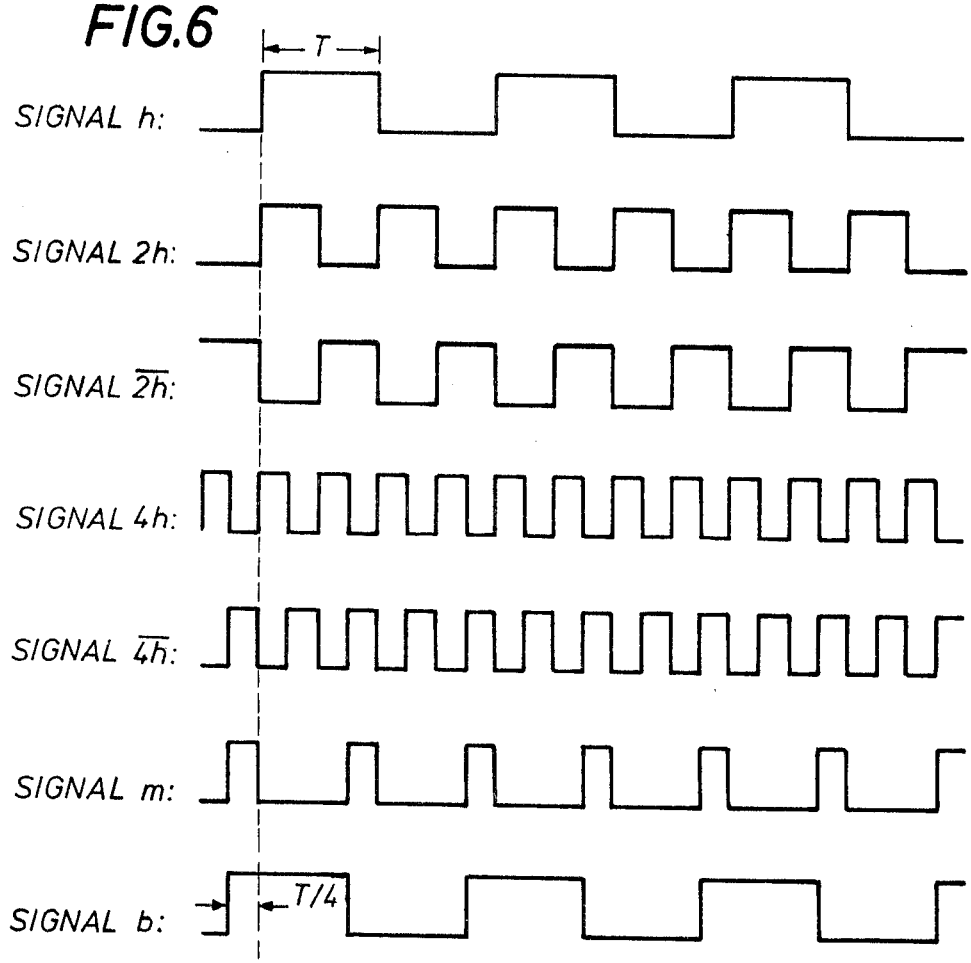

METHOD AND APPARATUS FOR DEMODULATING PSK MODULATED OSCILLATIONS

BACKGROUND OF THE INVENTION

The present invention relates to a method of demodulating a PSK modulated signal and to a circuit arrangement for practicing the method.

PSK modulation is understood by the person skilled in the art to be a modulation method which operates with so-called phase shift keying. In systems utilizing this modulation method, circuits containing phase-locked control loops are utilized to demodulate the subcarriers or data, respectively. Two types of such circuits which are commonly used to demodulate the subcarrier are the squaring loop and the Costas loop. Both of these control loops include a phase detector, a control filter and an oscillator which can be varied in its frequency by a control voltage.

In each of these circuits, if a difference in phase exists between the input signal and the reference signal generated by the oscillator, the phase detector will generate a control signal which is smoothed by the control filter and varies the oscillator frequency in such a manner that the difference in phase becomes minimal. Since with PSK modulated input signals the polarity of these signals changes in the rhythm of the data modulation by $\pm 180°$, the phase detector of the control loop must be designed so that these phase shifts in the input signal will not influence the control signal of the oscillator. Such prior art control loops are shown in FIGS. 1 and 2.

In the *squaring loop* of FIG. 1, the input signal $(\pm A_1 \sin\omega_u t)$ is fed through a bandpass filter 1 to a squaring or doubler stage 2 and then through a bandpass filter 3, which is tuned to the double frequency, to a chopper 4. The output signal from the chopper 4, which is proportional to the phase shift between the input signal and the reference voltage from a reference oscillator 6, is smoothed in the loop filter 5 and controls the frequency of the oscillator 6. In order to generate the output signal, the frequency of the oscillator 6 is divided in half in a frequency divider, the phase of the resulting signal is shifted by 90° in a phase shifter 8 and is then fed, together with the input signal of the loop, to a further chopper 9. The output signal of the chopper 9 can be mathematically described as $$\pm A_2 \sin^2 \omega_u t,$$

where the sign always includes the binary data information.

In the *Costas loop*, as shown in FIG. 2, the input signal $(\pm A_1 \sin \omega_u t)$ is fed in parallel to two choppers 21 and 28. The output signals from the choppers 21 and 28 are smoothed by lowpass filters 22 and 29 respectively and fed to an analog multiplier 23. The output signal of the multiplier 23 is smoothed in the control filter 24, and used to control the frequency of the reference oscillator 25 so that the oscillator oscillates at twice the input frequency. The output signal from the oscillator 25 is fed to a frequency divider 26 wherein the frequency is cut in half and the resulting signal is fed to the chopper 21 as the reference voltage. The reference voltage for chopper 28 must be shifted in phase by 90° with respect to the input signal, and this is accomplished in a phase shifting stage 27. The demodulated signal appears at the output of chopper 28.

As can be seen, the known control loops are very complex in structure.

SUMMARY OF THE INVENTION

It is the object of the present invention to overcome the above-described drawbacks and to provide as simple a circuit as possible for the demodulation of PSK modulated signals.

This is accomplished according to the present invention in that the modulated input signal is combined with a first reference voltage which is of the same frequency as the input signal but which is advanced in phase by one-quarter of the period duration of the input signal, the resulting first output signal is delayed in time by one-half of the period duration of the input signal and is combined with an identical but undelayed first output signal and the resulting second output signal is utilized as the control voltage for setting the phase of a second reference voltage which is linked with the input voltage resulting in the demodulated output voltage.

Preferably this method is practiced so that the signals are digitalized. This results in advantageous possibilities for realizing an arrangement for practicing the method. Such arrangements may then comprise purely digitally operating individual elements. A preferred circuit arrangement for practicing the method of the present invention includes only three exclusive-OR circuits, a delay line, which is preferably a clock pulse controlled shift register, having a delay time equal to one-half of the period duration of the input signal, a control filter, a phase controllable square wave oscillator which oscillates at a multiple ($n$ times) of the input frequency and a frequency divider. If a shift register is not used as the delay line, the oscillator frequency need be only twice the input frequency, i.e., $n = 2$.

These components are connected together in such a manner that the first exclusive-OR circuit receives the input signal at one input and a reference voltage, which leads the input signal in phase by one-quarter of the period duration, from the frequency divider which divides the frequency of the oscillator by $n$. The output voltage of the first exclusive-OR circuit is connected both directly and via the delay line, to the two inputs of the second exclusive-OR circuit whose output signal is fed via the filter to the control input of the oscillator to control the phase of the oscillator. If the delay line is a clock-pulse controlled shift register, the latter will receive its clock pulses through a connecting line from the frequency divider. The output voltage of this frequency divider is the actual reference voltage for the input signal and is combined therewith in the third exclusive-OR circuit to form the demodulated output signal.

For mass production as well as for applications where particularly high reliability values are required, e.g. space travel, it is necessary to utilize circuit systems which provide the required electrical characteristics with a minimum of complexity. The present invention provides a phase control loop for the demodulation of PSK modulated carriers which meets these requirements in that dependable operation is assured with substantially less expenditures compared to the known methods.

BRIEF DESCRIPTION OF THE DRAWINGS

FIG. 4 shows pulse sequences for the circuit of FIG. 3.

FIG. 5 is a block circuit diagram for a specific embodiment of the frequency processor of FIG. 3.

FIG. 6 shows pulse sequences for the circuit of FIG. 5.

DETAILED DESCRIPTION OF THE PREFERRED EMBODIMENTS

Figure 1:
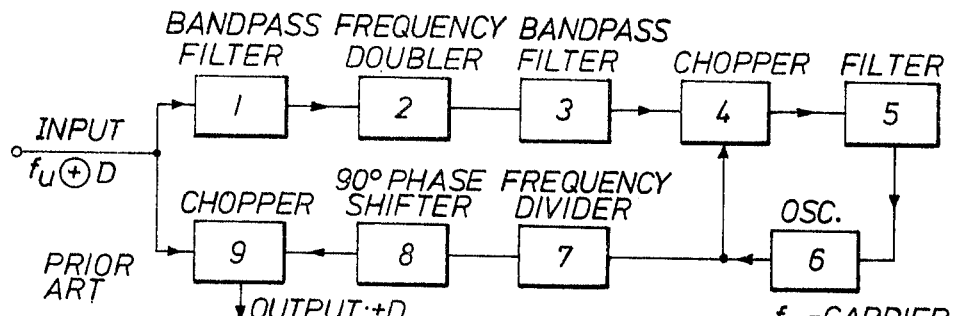
FIG. 1 is a block circuit diagram of a prior art demodulating circuit with a squaring loop as the control loop.
Figure 2:
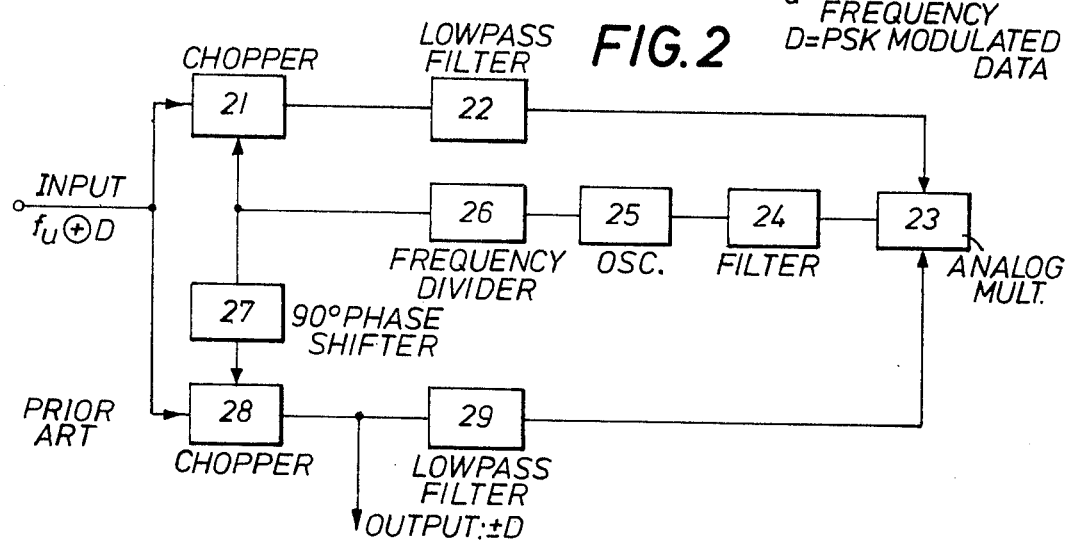
FIG. 2 is a block circuit diagram of a prior art demodulating circuit with a Costas loop as the control loop.
Figure 3:
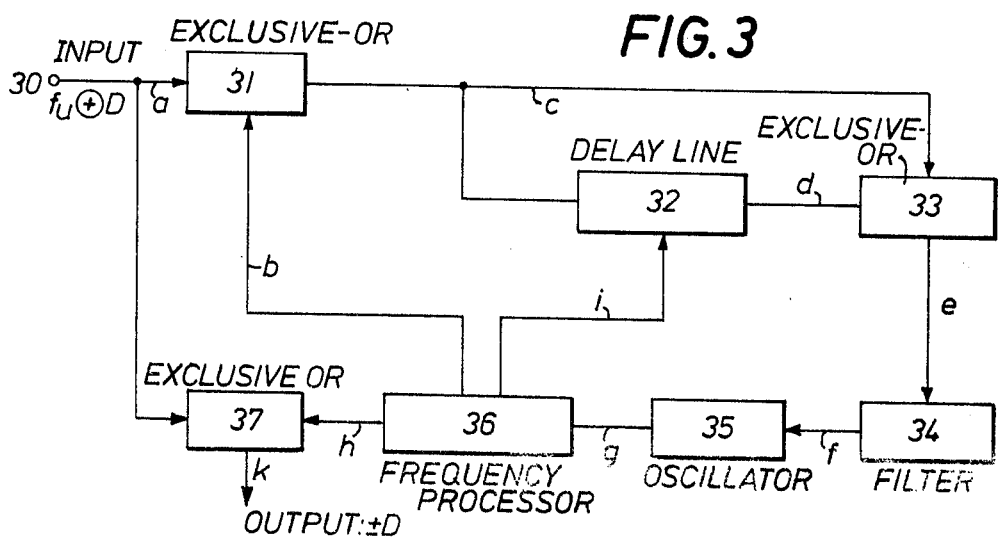
FIG. 3 is a block circuit diagram for a demodulating circuit with a control loop according to the present invention.

Referring now to FIGS. 3 and 4, the basic operation of the PSK demodulator according to the invention will be described for a digitally operating embodiment.

The modulated input signal a ($f_u \oplus D$, where $f_u$ is the signal frequency and D is the PSK modulated data) is fed via the input terminal 30 to one input of a first exclusive-OR circuit 31. To the other input of circuit 31 is fed a reference signal b which is of the same frequency $f_u$ as the input signal but is ahead in time, i.e., leading in phase, with respect to the input signal by T/4, where T is the period duration of the oscillation of the input signal (see FIG. 4). The output signal c of the exclusive-OR circuit 31 is fed directly to one input of a second exclusive-OR circuit 33, and is also fed to a delay line 32, which is preferably a clock pulse controlled shift register, and which has a delay time of T/2. The output signal d of the delay line 32 is fed to the second input of the exclusive-OR circuit 33 which provides a control signal e at its output. The control signal e, which is derived from the two signals c and d, has the following significant characteristics:

1. the average of the control signal e is proportional to the phase shift between input signal a and reference signal b. That is, with the phase of the reference signal being ahead of or leading its desired position in time, i.e., leading the input signal by more than T/4, the average becomes greater than when the phase difference between signals a and b is T/4, i.e., phase zero, and with the phase of the reference signal b lagging its desired position in time the average becomes smaller than for phase zero. The three above mentioned conditions for the control signal are shown in FIG. 4 wherein signal e represents the desired condition, and signals $e_1$ and $e_2$ show the control signal when the reference signal b is leading and trailing its desired position respectively. Thus it is possible to synchronize a control loop.

2. The control signal e does not change its characteristics if the input signal a exhibits shifts in phase by 180°. Thus there exists a possibility for demodulating PSK signals.

The control signal e is smoothed in a control filter 34 to form the control voltage f (see FIG. 4) which is fed to the control input of a phase controllable square wave oscillator 35, which oscillates at a multiple n of the input signal frequency to control the frequency thereof so that the phase difference between signals a and b equals T/4. The output signal from oscillator 35 is fed to a frequency processor 36 which produces three different signals in the preferred embodiment:

1. Signal h at a frequency $f_u$ by dividing by the factor n;
2. the reference signal b which represents the following logic function:

$$(f_u/n{-}1 \ \& \ f_u/n{-}2)\ /2$$

(the symbol "&" representing the logic AND connection); and 3. the clock pulse signal i for the shift register which constitutes the delay line 32 in the preferred embodiment.

Since signal i, which is the clock pulse signal for shift register delay line 32, effects a quantizing of signal c which continuously varies to correspond to the phase shift, the clock pulse signal i must have a frequency as high as possible compared to the frequency of signal c so that the quantizing steps remain small and signal d reproduces signal c as accurately as possible. Thus signal i in practice will normally have a frequency equal to that of the oscillator 35, i.e., $nf_u$.

Signal h appearing at the output of the frequency processor 36 constitutes the actual reference signal for the coherent demodulation of the input signal a. Accordingly, these two signals are fed to the two respective inputs of a third exclusive-OR circuit 37 and produce the demodulated output signal k at the output of the circuit 37.

A specific embodiment of the frequency processor 36 is shown in FIG. 5. The output signal g of the oscillator 35 is fed to the input of a frequency divider 50 consisting of four bistable multivibrators 51 to 54. As the frequency is divided by two in each multivibrator the frequency of the output signal h is 16 times smaller than the oscillator frequency g, that is the dividing factor n is 16. The output signal 2 h and the inverted output signal $\overline{2\,h}$ of the bistable multivibrator 53 and the output signal 4 h and the inverted output signal $\overline{4\,h}$ of the bistable multivibrator 52 are shown in FIG. 6. Both the signal 2 h and the signal 4 h are in phase with the signal h, but the signal 2 h is of double and the signal 4 h of fourfold the frequency of the signal h. The inverted output signals $\overline{2\,h}$ and $\overline{4\,h}$ are fed to the inputs of an AND-gate 55. The output signal m of this gate, which is also shown in FIG. 6, is fed to a clock input 57 of a bistable multivibrator 56, the inverted output 59 of this multivibrator being fed-back to a preparatory input 58. The output signal b at the terminal 60 is then of the same frequency as the signal h, but it is leading the signal h by T/4 as shown in FIG. 6.

The above description shows the advantages of the method of the present invention over the above mentioned prior art methods in that the circuit is greatly simplified. That is, in addition to the components generally used for all control loops, such as oscillator and logic linkages (division + 90°), the squaring loop must also additionally include two bandpass filters and a squaring stage (= doubler); the Costas loop additionally requires two lowpass filters and one analog multiplier; while the control loop according to the present invention requires, as additional elements, merely a shift register and two further exclusive-OR circuits.

Moreover, the described possible realization of the present invention permits a configuration which operates substantially digitally and which has decisive advantages due to its simple and expensive concept and the elimination of matching procedures (bandpass filters, analog multipliers) and the no longer existing drift problems resulting from temperature changes.

It will be understood that the above-description of the present invention is susceptible to various modifications, changes and adaptations, and the same are intended to be comprehended within the meaning and range of equivalents of the appended claims.

What is claimed is:

1. A method of demodulating an input signal modulated according to the phase shift keying method comprising the steps of:
    a. combining the input signal with a first reference signal of the same frequency as said input signal but which leads the input signal in phase by one-quarter of the period duration of said input signal;
    b. delaying the output signal from said step (a) in time by one-half of the period duration of said input signal;
    c. combining the undelayed output signal from said step (a) with the delayed output signal from step (b) to produce a control voltage;
    d. controlling the phase of an oscillator with said control voltage to set the phase of said first reference signal and of a second reference signal of the same phase and frequency as said input signal; and
    e. combining said second reference signal with said input signal to produce the demodulated output voltage.

2. A circuit arrangement for demodulating a digitalized input signal which is modulated according to the phase shift keying modulation method comprising in combination: a signal input terminal; a first exclusive-OR circuit having a first input connected to said signal input terminal, a second input and an output; a delay line having a delay time equal to one-half of the period duration of said input signal, the input of said delay line being connected to said output of said first exclusive-OR circuit; a second exclusive-OR circuit having a first input directly connected to said output of said first exclusive-OR circuit and a second input connected to the output of said delay line; a control filter means connected to the output of said second exclusive-OR circuit for providing a control voltage output signal; a phase controllable oscillator means, having its control input connected to the output of said control filter, for providing an output signal whose frequency is n times the frequency of said input signal; a frequency processor means connected to the output of said oscillator means for dividing the frequency of the output signal from said oscillator to provide a first reference signal at a first output which is of the same frequency and is substantially in phase with said input signal and a second reference signal at a second output thereof which is of the same frequency as said first reference signal but leads same by one-quarter of the period duration of said input signal, said second output of said frequency processor means being connected to said second input of said first exclusive-OR circuit; and a third exclusive-OR circuit having one input connected to said signal input terminal and its other input connected to said first output of said frequency processor means, the output of said third exclusive-OR circuit constituting the output of said demodulating circuit arrangement.

3. A circuit arrangement as defined in claim 2 wherein said delay line is a clock pulse controlled shift register whose clock pulse input is connected to a further output of said frequency processor means.

* * * * *